US006444980B1

(12) United States Patent
Kawato et al.

(10) Patent No.: US 6,444,980 B1
(45) Date of Patent: Sep. 3, 2002

(54) APPARATUS FOR PRODUCTION AND EXTRACTION OF CHARGED PARTICLES

(75) Inventors: Eizo Kawato, Cheadle; Alan Joseph Smith, Manchester; Koichi Tanaka, Sale, all of (GB)

(73) Assignee: Shimazdu Research Laboratory (Europe) Ltd., Manchester (GB)

( * ) Notice: Subject to any disclaimer, the term of this patent is extended or adjusted under 35 U.S.C. 154(b) by 0 days.

(21) Appl. No.: 09/647,250

(22) PCT Filed: Mar. 25, 1999

(86) PCT No.: PCT/GB99/00948

§ 371 (c)(1),
(2), (4) Date: Nov. 7, 2000

(87) PCT Pub. No.: WO99/53521

PCT Pub. Date: Oct. 21, 1999

(30) Foreign Application Priority Data

Apr. 14, 1998 (GB) .............................................. 9807915

(51) Int. Cl.[7] .......................... H01J 49/16; H01J 49/00; B01D 59/44

(52) U.S. Cl. ....................... 250/307; 250/281; 250/288; 250/307; 250/309; 250/423 P

(58) Field of Search ................................ 250/307, 288, 250/281, 309, 423 P

(56) References Cited

U.S. PATENT DOCUMENTS

| | | | | |
|---|---|---|---|---|
| 4,204,117 A | 5/1980 | Aberle et al. | 250/287 |
| 5,117,108 A | 5/1992 | Muller et al. | 250/288 |
| 5,118,937 A | 6/1992 | Hillenkamp et al. | 250/282 |
| 5,965,884 A | * 10/1999 | Laiko et al. | 250/288 |
| 6,326,163 B1 | * 12/2001 | Forssmann et al. | 435/24 |

FOREIGN PATENT DOCUMENTS

| | | |
|---|---|---|
| EP | 829901 A | 3/1998 |
| GB | 2 138 626 A | 10/1984 |
| JP | 4306549 | 10/1992 |

OTHER PUBLICATIONS

Hillenkamp et al., "Method and Apparatus for MALDI Analysis", US 2002/0005478 A1. U>S> Patent Application Publication, Jan., 17, 2002.*

Smith et al., A Comparison of Matrix/Analyte Protein Surface Distributions in MALDI Samples by XPS Analysis, *Proceedings of the ASMA Conference*, p. 1041 (1997).

Tanaka et al., "Protein and Polymer Analyses up to m/z 100,000 by Laser Ionization Time–of–Flight Mass Spectrometry," *Rapid Communications in Mass Spectrometry*, 2:8, pp. 151–153 (1988).

Vorm et al., "Improved Resolution and Very High Sensitivity in MALDI TOF of Matrix Surfaces Made by Fast Evaporation," *Anal. Chem.*, 66:19, pp. 3281–3287 (1994).

Xiang and Beavis, "Growing Protein–doped Sinapic Acid Crystals for Laser Desportion: an Alternative Preparation Method for Difficult Samples," *Organic Mass Spectrometry*, 28, pp. 1424–1429 (1993).

* cited by examiner

*Primary Examiner*—Bruce Anderson
*Assistant Examiner*—Zia R. Hashmi
(74) *Attorney, Agent, or Firm*—Leydig, Voit & Mayer, Ltd.

(57) ABSTRACT

The apparatus comprises a sample, an optical element (4) in the form of a truncated pyramid having at least one reflective surface (1*a*) and a hole (7). A laser (18) directs radiation on to the sample via the reflective surface (1*a*) and the charged particles are extracted and directed along an extraction axis through the hole (7).

29 Claims, 7 Drawing Sheets

APPARATUS FOR PRODUCTION AND EXTRACTION OF CHARGED PARTICLES

FIELD OF THE INVENTION

This invention relates to apparatus for the production and extraction of charged particles, particularly such apparatus wherein the emission of charged particles is stimulated by light irradiation.

BACKGROUND OF THE INVENTION

The emission of charged particles stimulated by light irradiation is a fundamental physical process used in many modern analytical techniques. One of the main requirements of a system using such a process is to combine the most efficient generation and transmission to the desired destination of the emitted charged particles with the most effective use of the light irradiation.

Light Stimulated Charged Particle Emission.

A fundamental physical process first noted when electrons were seen to be emitted when irradiated by a light source, light stimulated particle emission forms the basis of many materials analysis techniques. Nowadays the full range of the electromagnetic spectrum may be utilised and the charged particle may be an electron, ,positron, anion or cation.

Charged Particle Extraction.

For the most efficient extraction of charged particles in an electric field, it is generally accepted that the closer the initial trajectories are to being parallel with the axis of extraction, the higher the efficiency. In this case the efficiency refers to the number of charged particles that are transferred from the region of their emission to their destination with the desired parameters optimised. For example, the parameter may be energy or time dispersion and the optimisation is to minimise these parameters. One solution to optimising these parameters is to exclude those that do not satisfy the requirements. This is often achieved by physically preventing them being detected. This reduces the number of charged particles analysed and sensitivity problems may arise if the source is of low emissivity. A compromise must then be made between sufficient sensitivity and the optimisation of the required parameters to make the analysis meaningful.

An important factor in the efficient extraction of charged particles is the coincidence or near coincidence of the axes of emission and extraction.

MALDI Analysis

Presently such a system is widely, although not exclusively, used in the Matrix Assisted Laser Desorption and Ionisation (MALDI) technique used for the analysis of biological, biochemical and polymeric materials as described in Protein & Polymer Analyses up to M/Z 100,000 by Laser Ionisation Time-of-Flight Mass Spectrometry, K. Tanaka et al. Rapid Comm. Mass Spectrom. Vol.2, pp 151–153, 1988. Key to this technique are the desorption and ionisation processes which allow intact large molecules to be extracted from the sample, a so-called "soft ionisation" technique. Typically, a substance called the matrix, which is in solution, is combined with the substance to be analysed, the analyte, also in solution, on a sample stub or slide. This combination is allowed to dry and then placed inside an evacuated chamber. Emission and ionisation of intact large molecules is then stimulated by the use of a laser. The ionised molecules produced are then accelerated away from the sample by an electric field and into an analyser. The use of a pulsed laser allows a relatively simple and low cost Time-of-Flight (ToF) mass analyser to be used for obtaining information from the sample, e.g. identifying the molecular weight.

In MALDI, the matrix is chosen for its good absorption of energy from the laser and, additionally, through a photon and/or chemical ionisation process, provides a mechanism that produces a quantity of ions from the analyte for analysis. To obtain the best results from the wide range of analytes which can be analysed by the MALDI technique many different matrices are used, each offering some different characteristics which are dependent on the chemistry of the analyte. Therefore, it is necessary to match the matrix to the analyte to be analysed. However, this condition of matching the matrix and analyte to achieve the best level of information often gives rise to non ideal conditions for optimised ion extraction. These non ideal conditions manifest themselves in the form of surface roughness and inhomogeneities in the combination of matrix and analyte. In the case of poor mixing of matrix and analyte, care in the preparation of the sample can alleviate many of the problems, as described, for example, in "Growing Protein-doped sinapinic acid crystals for Laser Desorption," Xiang and Beavis, Organic Mass Spectrometry, Vol.28, pp 1424–29, 1993. However, surface roughness can be very difficult to eliminate, as the drying process often leads to unavoidable crystallisation. This crystallisation can give rise to surface roughness of the order of 10 to 50 microns or more as described in "A comparison of matrix/analyte protein surface distributions in MALDI samples by XPS analysis " by A Smith et al. Proceedings of the 45th ASMS Conference, p1041, 1997.

Another issue with biological and biochemical analysis is efficient sample utilisation. In many cases the amount of a substance that is available for analysis is very limited so effective ionisation and extraction is often an important factor in MALDI analysis. Model of the MALDI Process The fundamental MALDI process of ejection and ionisation is not currently well understood. In part this is because of the large variety of matrix/analyte combinations. That is to say, what might be understood for one particular matrix/analyte combination may not apply to a different combination. This makes a common model difficult, if not impossible, to define. Another difficulty in performing an analysis of both the physical and chemical processes is that they take place in the order of tens of nanoseconds making measurement extremely difficult.

It is however possible to have a good qualitative model of the MALDI process. In this model the pulsed laser irradiates a region of the sample. Some molecules in this region receive sufficient energy to escape from the sample. This is called laser ablation. The laser is pulsed at a high energy, but with a short duration, of the order of nanoseconds, to remove some of the material from the sample. This material is ejected in a supersonic plume away from the surface of the sample. Either during or shortly after ablation, a number of the sample molecules become ionised. They can then be extracted by the application of a suitable electric field.

Angular Distribution of Ablated Material.

FIG. 1 shows where the pulsed laser beam 1 irradiates an area of the sample 2 which is ablated 3. FIG. 1 also shows the angular distribution 6 for a point source which has the largest number of particles ablated along trajectories perpendicular to the surface. Extrapolating this point distribution across the surface gives rise to the distribution shown by the dotted line 7. In general, the distribution of ablated material has an axis of ejection 5 perpendicular to the surface and only has a weak dependence on the angle of incidence 4 of the irradiating light source 1. This is for the case of a perfectly flat surface. However, if we compare this to the case of a rough or curved surface then the angular distribution of the ablated material is modified. In FIG. 2 we see a curved surface which we can treat as a series of straight line segments or tangents 2 joined together as shown which is irradiated by a light source 4. By treating each of these tangents as a local surface we then can define a local axis 5 which is perpendicular to that local surface 2. Each local surface 2 therefore has its own local axis 5. The distribution of ablated material 3 from the local surface about the local axis 5 is the same as for a point source as shown in FIG. 1. If we now extrapolate these to obtain the distribution 4 over the whole curved surface that is irradiated we see that it is considerably broadened compared to the case of the flat surface. By a logical extension of the argument this broadening of the angular distribution can also be seen to be true for a concave as well as the illustrated convex surface.

This broadening of the angular distribution arises wherever the local axis of emission varies across the sample surface, i.e. as in the case of a rough surface. Referring back to the earlier comments on charged particle extraction, any increase in the angular distribution of charged particles leads to reduced efficiency and it is therefore desirable to minimise this angular distribution. This is in general agreement with the work by Vorm et al entitled "Improved Resolution and Very High Sensitivity in MALDI ToF of Matrix Surfaces made by Fast Evaporation." Anal.Chem.Vol.66, No.19, pp 3281–3287, 1994.

Shadowing.

In FIG. 3*a* we see the situation where the axis of irradiation 1 is at an angle with respect to the axis of extraction 9. This can give rise to shadowing of an area 3 of the sample surface 4 from the light irradiation 5. This is due to the surface structure 6. Hence it can be seen that not all of the sample in the area of interest 2 is irradiated. Also, as can be seen in FIG. 3*b*, charged particles are emitted with local axes of emission 7 which have large angular deviations relative to the axis of extraction 9.

FIG. 4*a* shows the case of near perpendicular irradiation of the sample 4. In this situation the axis of irradiation 1 and the axis of extraction 9 are closer to being coincident than is the case in FIG. 3*a*. It can be seen that the irradiated area 2$\alpha$ and 2$\beta$ is larger than the irradiated area 2 in FIG. 3*a* and the shadowed area 3 caused by the surface structure 6 is smaller when compared to the same region 3 in FIG. 3*a*. In FIG. 4*b* it can also be seen that the number of ions that are emitted with local axes of emission 7 nearly coincident with the axis of extraction 9 is increased.

Ablation Volume.

The amount of material ablated is dependent on the amount of energy deposited and effectively absorbed in a volume of the sample near to the surface. As shown in FIGS. 3*b* and 4*b*, the shaded area 8 indicates the volume of the sample that absorbs the energy from the irradiating light. In both cases the irradiated volume is approximately the same. However, the volume beneath surfaces perpendicular to the axis of extraction is greater in the case of near perpendicular irradiation. This demonstrates that the emission of material from the surfaces that have the smallest angular deviation from the axis of extraction is enhanced. A corresponding decrease in emission is seen in areas that have large angular deviations from the axis of extraction.

Optimisation of Efficiency.

From the argument presented it can be seen that it is highly advantageous for the axis of irradiation to be as closely coincident with the axis of extraction as is practical. This minimises emission from the areas of the sample that reduce the efficiency of the charged particle extraction, i.e. surfaces that are not perpendicular to the axis of extraction, and maximises emissions from surfaces that are, thereby improving the efficiency of the ion extraction.

Also, sample preparation becomes less critical as it allows the user to focus on obtaining the best results from the chemistry without having to be overly concerned with the additional problem of attaining a suitably flat sample.

A further benefit is an increase in the sample utilisation allowing smaller sample quantities to be used. This is highly-desirable in the case of many biological and biochemical samples where often only picomoles or femtomoles of material is available for the analysis.

Prior Art

In general, the prior art has failed to satisfy the requirements for the most efficient charged-particle generation and transmission of the emitted charged particles to the desired destination combined with the most effective use of the light irradiation. In the majority of cases, compromise has been made in the light irradiation which is typically incident on the sample at an angle in the range from 45 degrees to 60 degrees with respect to the axis of extraction. This compromise is preferred since introducing asymmetry into the extraction system reduces the overall efficiency to a far greater degree.

FIG. 5 shows a typical system as used in MALDI. The system comprises a laser 2, a neutral density filter 3, a mirror 4, a focusing lens 1, a window 5, an evacuated chamber 6, a sample 7, a grid 9 and an electrostatic lens 8. In a typical system, the source of light irradiation is a pulsed laser 2, its power being attenuated by the neutral density filter 3 to the desired level. The laser beam 11 is then reflected by the mirror 4 towards the lens 1 where it is focused to pass through the window 5 to irradiate the sample 7. Charged particles emitted are then accelerated along the axis of extraction 12 by the application of an electric field. An extraction system comprising the sample 7, the grid 9 and the focusing lens 8 is used to accelerate and focus the emitted charged particles (indicated by the trajectory envelope 10) along the axis of extraction 12. As can be seen, the typical system does not address the problem of efficient extraction as discussed previously. Other methods of introducing light irradiation to a sample in an electrostatic field are now discussed and their merits and demerits are presented.

One method of irradiating the sample involves using a fibre optic guide to direct the irradiating light to the sample. This is described in U.S. Pat. No. 5,118,937. FIG. 6 shows such a system wherein a laser beam 7 is focused by a lens 5 into an optical guide 3 and focused onto the sample 2 by a lens 6 at the other end of the guide. Ions 4 generated in this manner are extracted through a grid 1 along the extraction axis 8. This suffers similar demerits as described with reference to FIG. 5, with the additional drawback that the electrically insulating material of the optical guide is situated inside the electric field region; this can lead to an asymmetric extraction field due to an accumulation of static electrical charge on the optical guide.

FIG. 7 shows a further example of the prior art where a sample observation and illumination system is implemented in addition to the light irradiation. In this case, the sample observation is at an angle similar to that used for the light irradiation, but viewing is from a different axis. This is the simplest implementation of a sample observation system. A laser beam 1 irradiates the sample 4 after being focused by the lens 2. The sample is illuminated with visible light 6 and the sample is observed by forming an image at the viewing position 5 using the lens 7. Ions 10 are extracted along the axis of extraction 9 by an electric field through an extraction grid 3 and focused by an electrostatic lens 8. The disadvantages of this system are the reduced efficiency of the extraction system and the poor correlation between observation and the irradiation point. Also because the angle of observation is acute, a large depth of field is required to obtain a useful field of view.

Systems where the observation axis and the irradiation axis are coincident are achievable by the use of Dichroic mirrors, but such systems are complex, expensive and inflexible. Therefore, these systems will not be considered any further.

A method for the perpendicular or near perpendicular irradiation of a sample is shown in FIG. 8. Here an angled mirror 4 having a hole 7 is placed so that the hole lies on the axis of extraction 8. In the case of a mirror inclined at 45 degrees, the axis of irradiation 9 is usually perpendicular to the axis of extraction 8. The irradiating light 5 is focused by a lens 1 and is reflected by the mirror 4 towards the sample 3. Ions 11 generated by the irradiating light 5 are accelerated along the axis of extraction 8 by an electric field between the sample and the grid 2 and pass through the hole 7 in the mirror 4 via the electrostatic lens 10. In this system, the mirror 4 is asymmetric with respect to the extraction axis. In general, if the best extraction efficiency is to be achieved, then asymmetry of the extraction system should be avoided. This typically requires the mirror to be in a region free from electric fields. This can place serious constraints on the design of the extraction optics. Furthermore, any irradiating light 6 which is not reflected, but passes through the hole 7 is lost and hence the power from the irradiating source is reduced. Sample observation and illumination is also difficult to implement as described previously.

A further known method involving the use of a Cassegrain mirror system is shown in FIG. 9 and is described in detail in U.S. Pat. No. 5,117,108. This method has the merit of being free from chromatic aberrations, has a high spatial resolution and a near normal incident angle but suffers the demerits of complexity and losses of power due to the geometrical configuration. In this case, a laser beam 3 irradiates the first mirror 5 which contains an aperture 8. Light not reflected continues on to irradiate the sample. The reflected light strikes the second mirror 1 which reflects and focuses the light onto the sample 2. Ions 4 generated by the irradiating light are accelerated along the axis of extraction 9 away from the sample 2 by an electric field and focused through the aperture 8 by an electrostatic lens 7. The main merit of this system is the coincidence of the axes of extraction and irradiation. Primarily such systems are used in Time-of-Flight surface analysis systems where very high laser powers are used. It, too, suffers the demerit of the loss of laser power through the aperture as in the previous example, FIG. 6, with the additional demerit that unfocused laser light 6 passes on to irradiate the sample but has the advantage of being symmetrical about the extraction axis thereby simplifying the extraction optics and optimising the extraction efficiency. A further demerit is the complexity and the cost of the system and the difficulty in implementing sample observation and illumination.

FIG. 10 shows a sample irradiated from the reverse side, and this is described in U.S. Pat. No. 4,204,117. This has the advantage that the laser probe is orthogonal and fully controllable from outside the evacuated chamber, but it is reliant on thin and very flat samples being prepared on a substrate that is optically transparent at the wavelength of the laser probe. In this example, laser beam 5 is focused by lens 3 onto a sample 2. Ions 4 are emitted from the opposite side of the sample 2 which is situated in an evacuated chamber, and these Ions accelerated by an electric field through the grid 1. The main merit of this method is the orthogonal irradiation of the sample from atmosphere where control is easy to implement, and the efficient extraction of ions along the extraction axis. The main demerits are the requirement for special sample preparation and the difficulty of relating sample observation to the sample irradiation position.

SUMMARY OF THE INVENTION

According to the invention there is provided an apparatus for the production and extraction of charged particles comprising a sample substrate upon which a sample is deposited, an optical element having at least one reflective surface and having at least one hole extending through the optical element, irradiation means for directing radiation onto a surface of the sample via said at least one reflective surface to stimulate emission of charged particles and extraction means for extracting at least some of the charged particles and directing the extracted charged particles away from said surface along an extraction axis so that said charged particles pass from said sample through said hole in the optical element, wherein the optical element has at least one side surface inclined towards the sample, the or each side surface is disposed downstream of an opening to said at least one hole with respect to the direction of extraction of the charged particles, and said at least one reflective surface is provided on a said side surface.

One advantage of this apparatus is that the axis of irradiation and the axis of extraction are nearly coincident, therefore optimising the efficiency of the extraction and irradiation systems as previously discussed. This invention satisfies both requirements without the need for compromise. It also has the additional advantage that in the case of a multi-faceted optical element multiple irradiation sources, sample visualisation, illumination and scanning of the irradiating light source(s) can easily be incorporated using the same low cost optical element. Furthermore, different optical properties can be incorporated on different facets of the element independently of the other facets without significantly altering the extraction efficiency. Cost of manufacture is relatively low and all other components in the optical path can be standard parts giving increased flexibility without introducing additional cost. The electrostatic design is simplified since the optical element can be manufactured from or coated by electrically conductive material and preferably is symmetrical about the extraction axis in the critical areas close to the axis and can therefore be designed to form an integral part of the extraction system.

The optical element itself can be a cone, pyramid or a similarly shaped solid having a multi-sided base and sloping sides which project to meet at an apex, and the element may be truncated. The optical element has a hole or holes passing through it whose centre line or lines may be concentric with or parallel to a line joining the geometric centre of the base to the projected apex.

In a preferred embodiment of the invention, said at least one reflective surface is inclined at an angle at or around 45° to the extraction axis. At least one said reflective surface may include a coating giving the surface a specific reflection coefficient, and each of at least two of said reflective surfaces may have a different coating giving a different specific reflection coefficient.

The at least one reflective surface may be flat or concave, and the optical element may have a further surface which lies in a plane perpendicular to the extraction axis and faces the sample, and which may be flat, concave, convex or a combination thereof. Said at least one hole may be circular, elliptical or of regular shape comprising two or more curved segments or three or more straight segments. Alternatively, the hole may be of irregular shape comprising two or more curved segments or three or more straight segments.

The hole or holes may be covered by a mesh or grid.

BRIEF DESCRIPTION OF THE DRAWINGS

An embodiment of the invention will now be described, by way of example only, with reference to the accompanying drawings of which.

DESCRIPTION OF PREFERRED EMBODIMENT

Figure 1:
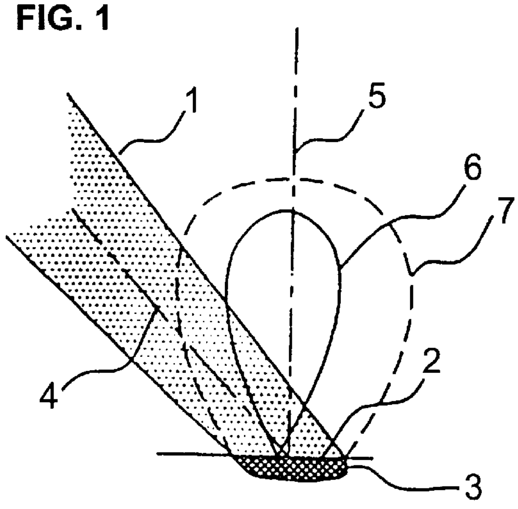
FIG. 1 shows the principle of laser ablation with particular reference to MALDI.
Figure 2:
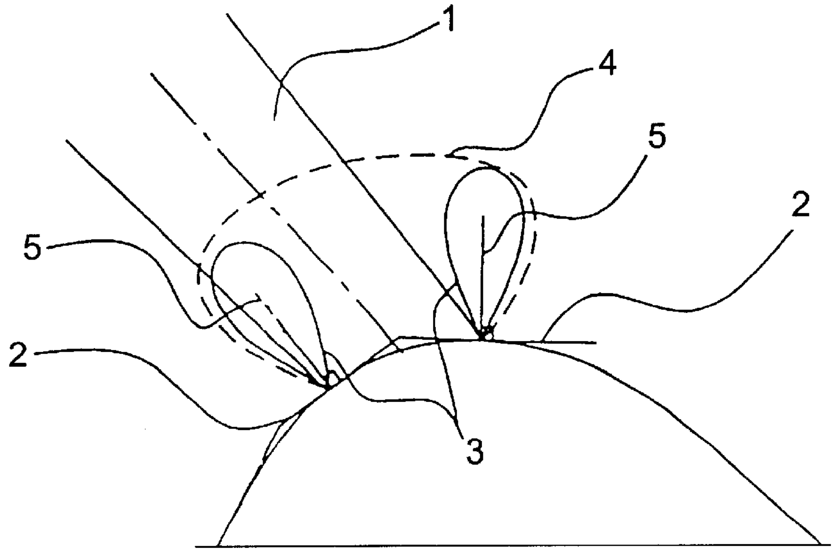
FIG. 2 shows typical angles and distribution of particles emitted from the surface of a sample during laser ablation.
Figure 3A:
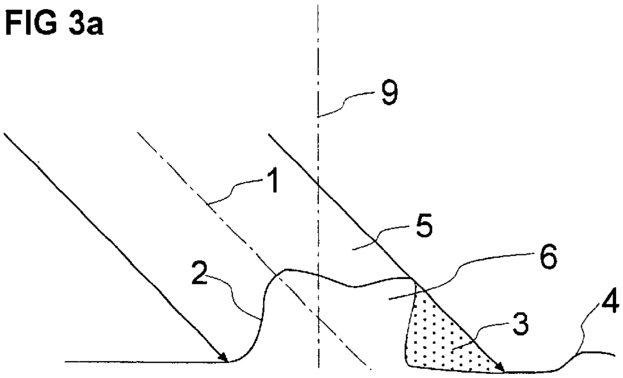
FIGS. 3*a* and 3*b* show the effects of shadowing of areas of the sample from the incident light irradiation due to surface roughness at an angle approximately 45° to the axis of extraction.
Figure 3B:
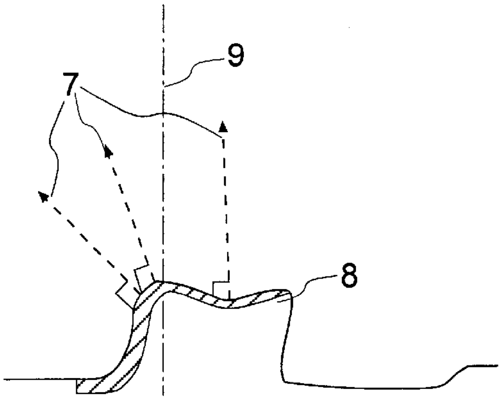
Figure 4A:
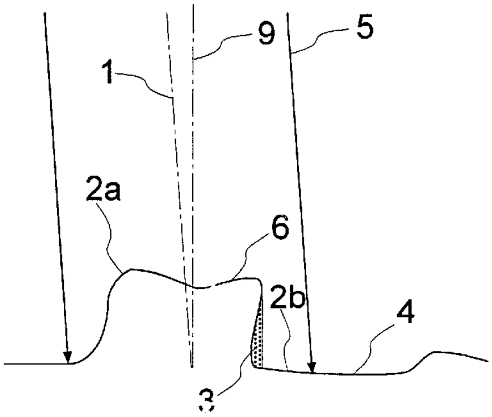
FIGS. 4*a* and 4*b* show the effects of shadowing of areas of the sample from the incident light irradiation due to surface roughness at angles nearly coincident with the axis of extraction.
Figure 4B:
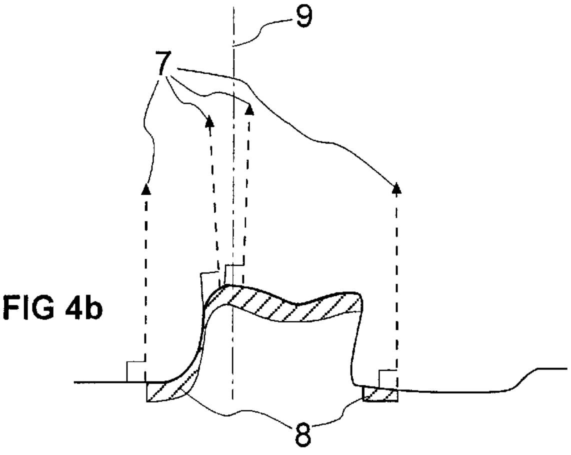
Figure 5:
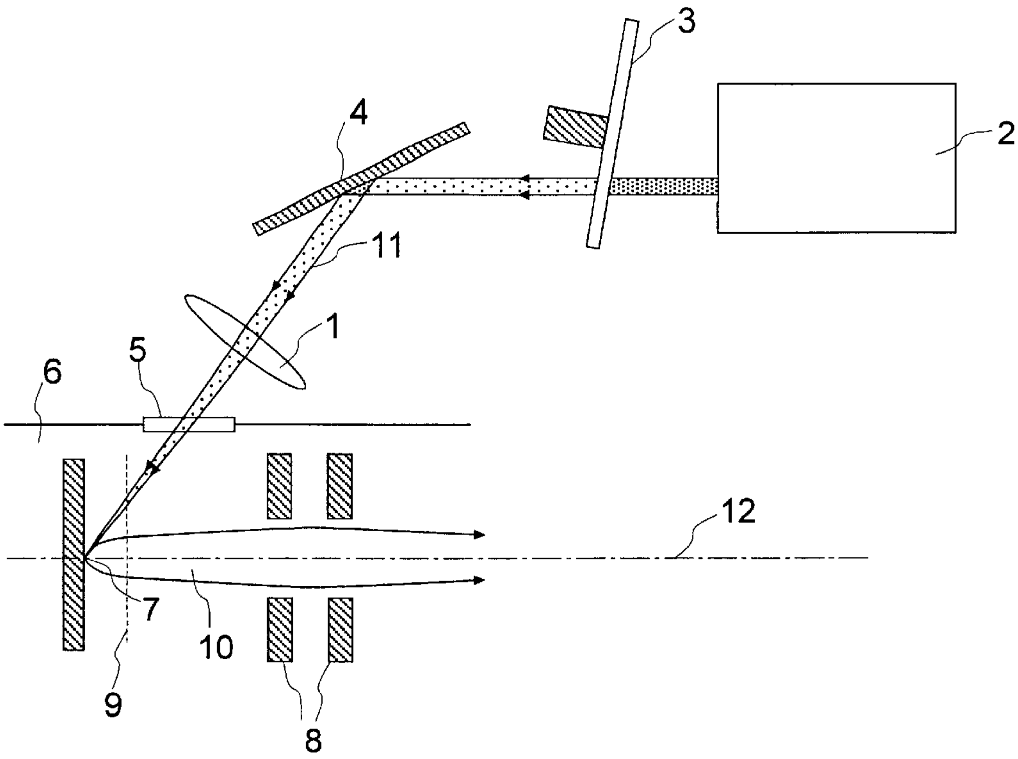
FIG. 5 shows a typical apparatus commonly used in a MALDI ToF mass spectrometer.
Figure 6:
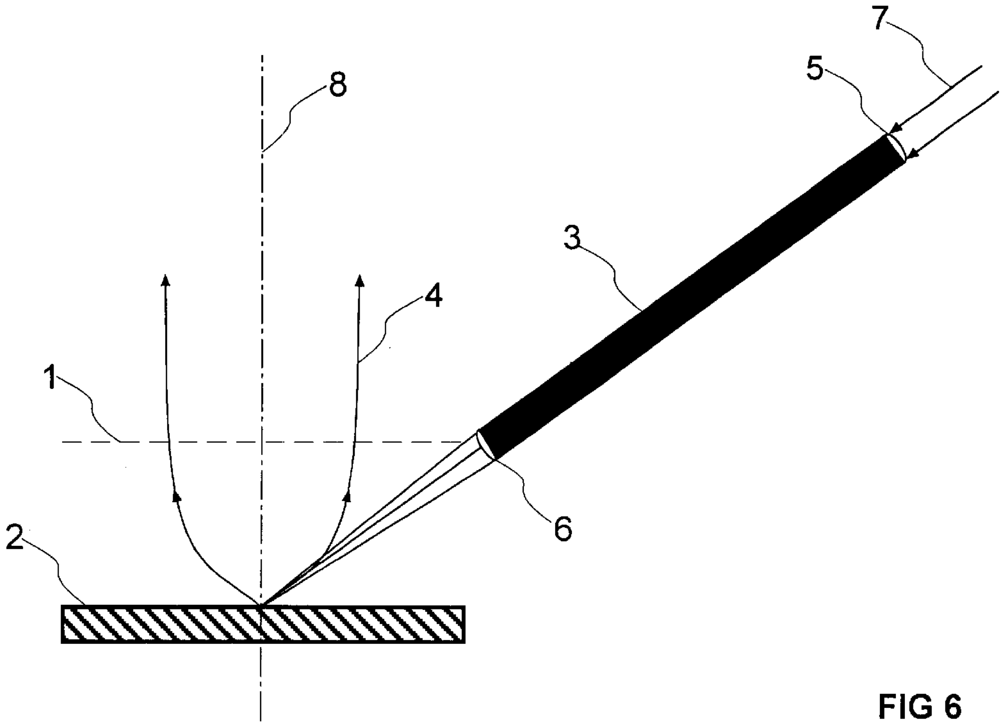
FIG. 6 shows the use of a fibre optic wave guide used to direct a laser pulse to a sample.
Figure 7:
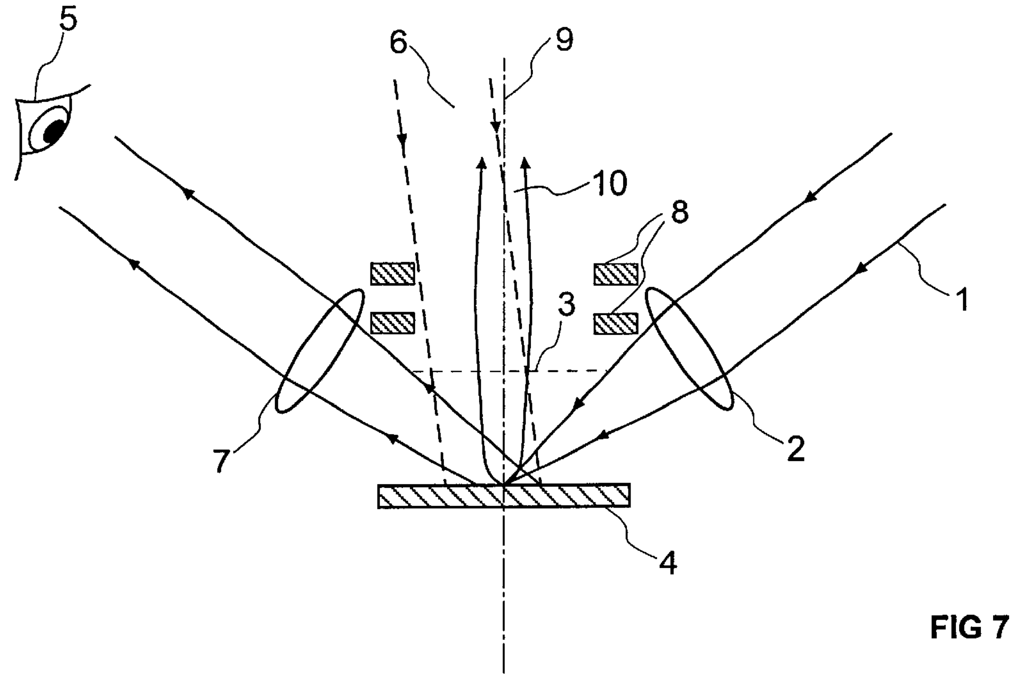
FIG. 7 shows a common implementation of sample irradiation combined with sample observation.
Figure 8:
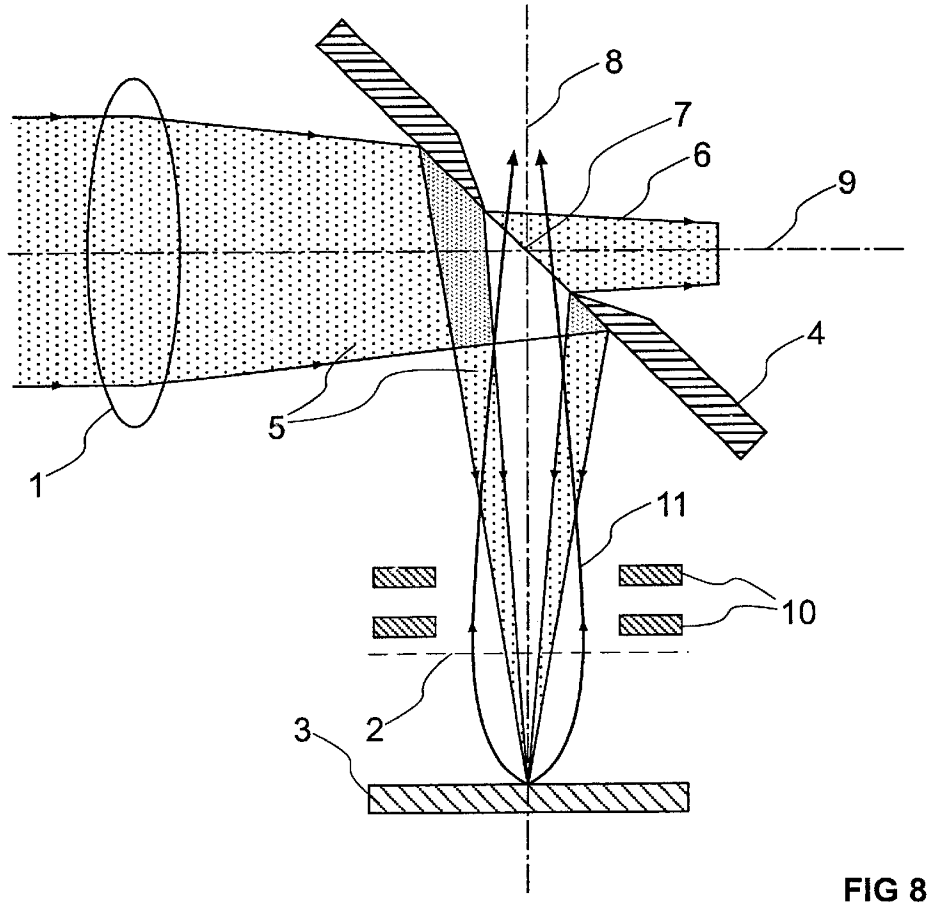
FIG. 8 shows the use of a 45° mirror lying on the axis of extraction used to direct a laser beam onto the sample with a near perpendicular angle of incidence.
Figure 9:
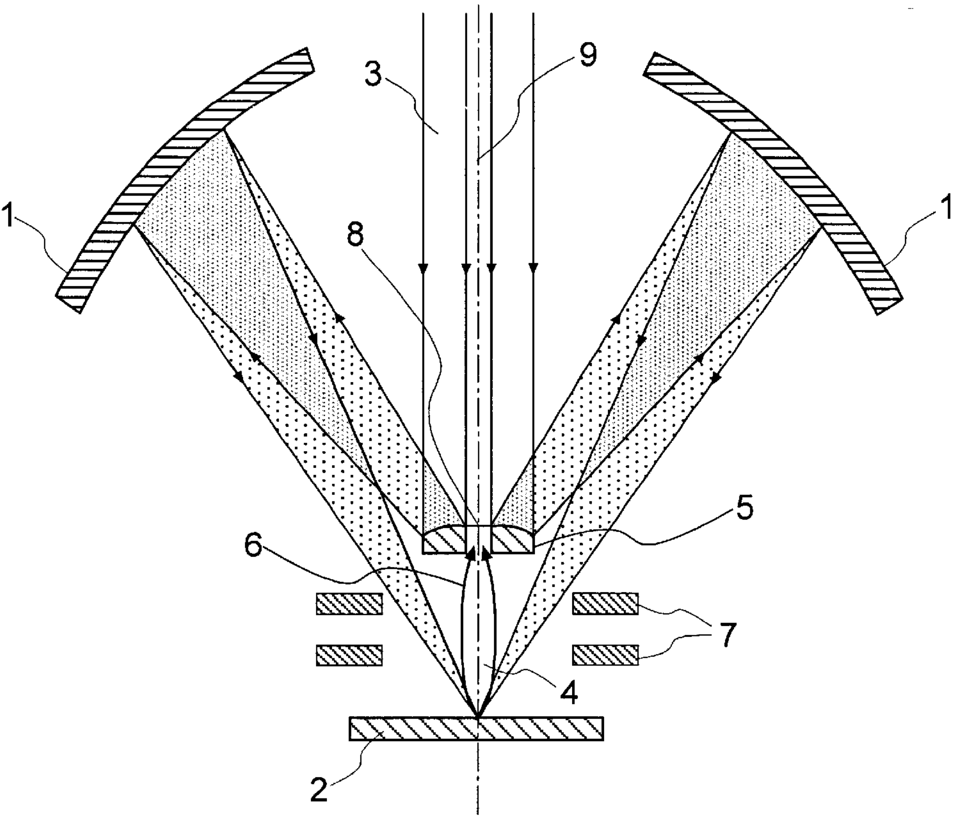
FIG. 9 shows the principle of the Cassegrain mirror used for perpendicular laser irradiation.
Figure 10:
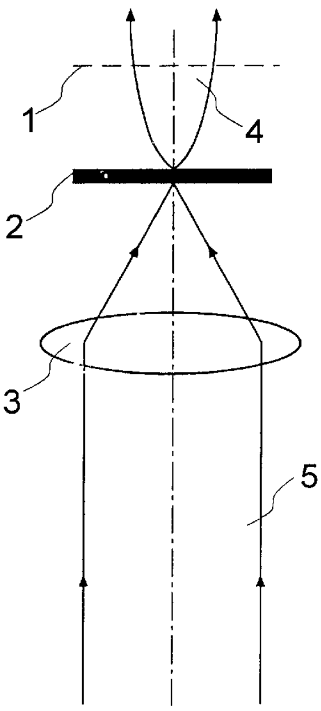
FIG. 10 shows a known method of ion generation stimulated by irradiation through the sample.
Figure 11A:
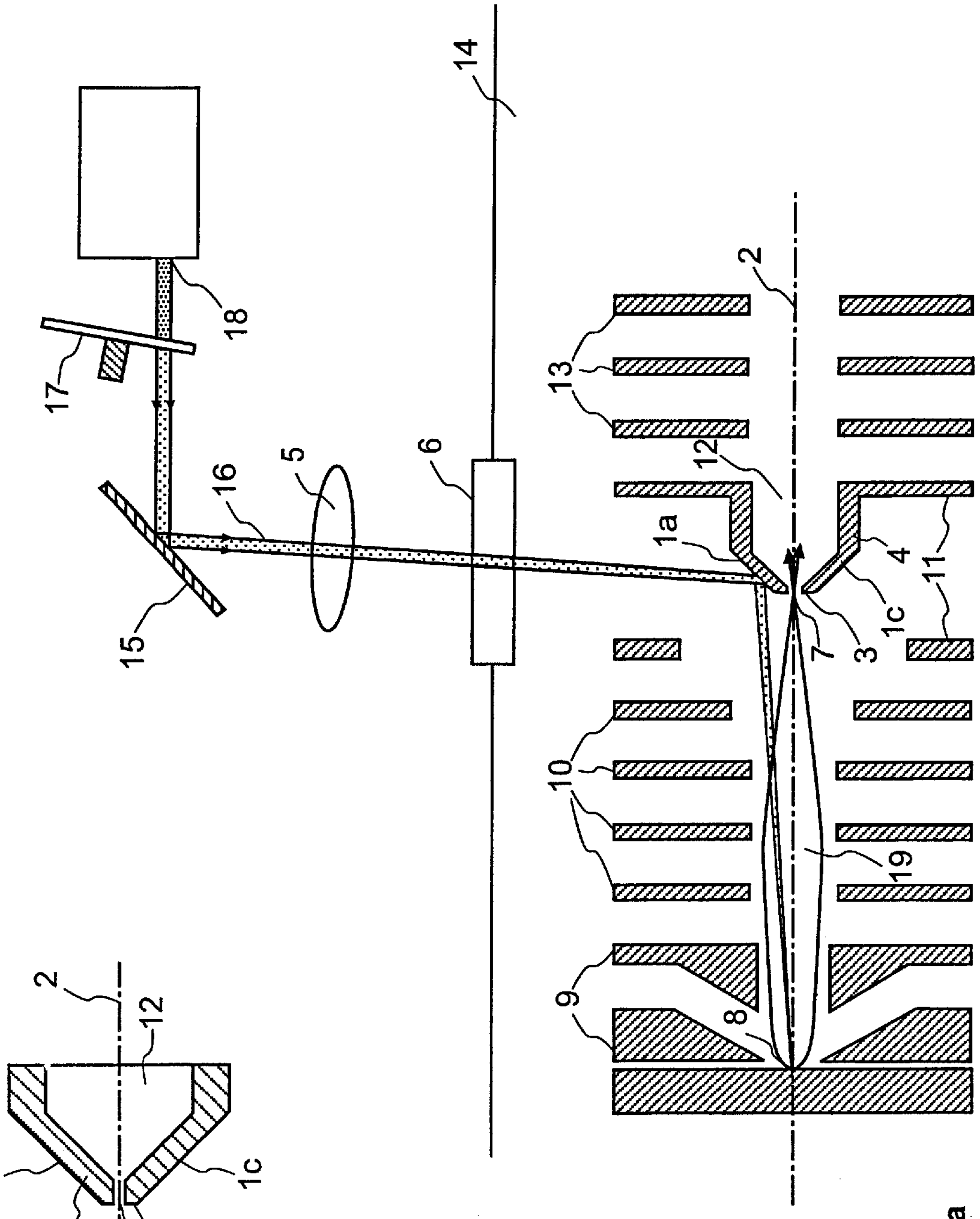
FIG. 11*a* shows schematically the configuration of a MALDI system incorporating a preferred embodiment of the invention.
Figure 11B:
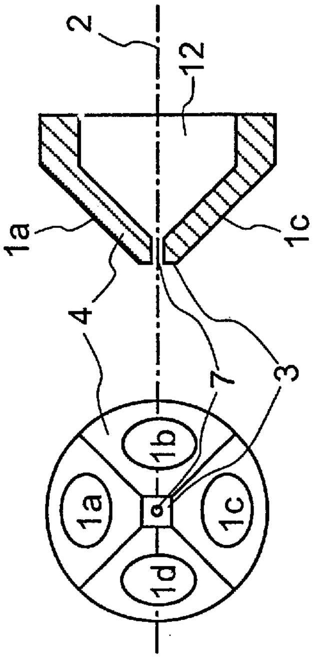
FIG. 11*b* shows schematically the optical element used in the system of FIG. 11*a*.

In a preferred embodiment shown in FIG. 11*b* the optical element comprises a truncated four-sided pyramid 4 having an hole 7 in the centre of the truncated face 3 passing through into a cavity 12 inside the element. Each of the sloping sides comprises a reflective surface 1*a*,1*b*,1*c*,1*d*.

Figure 12:
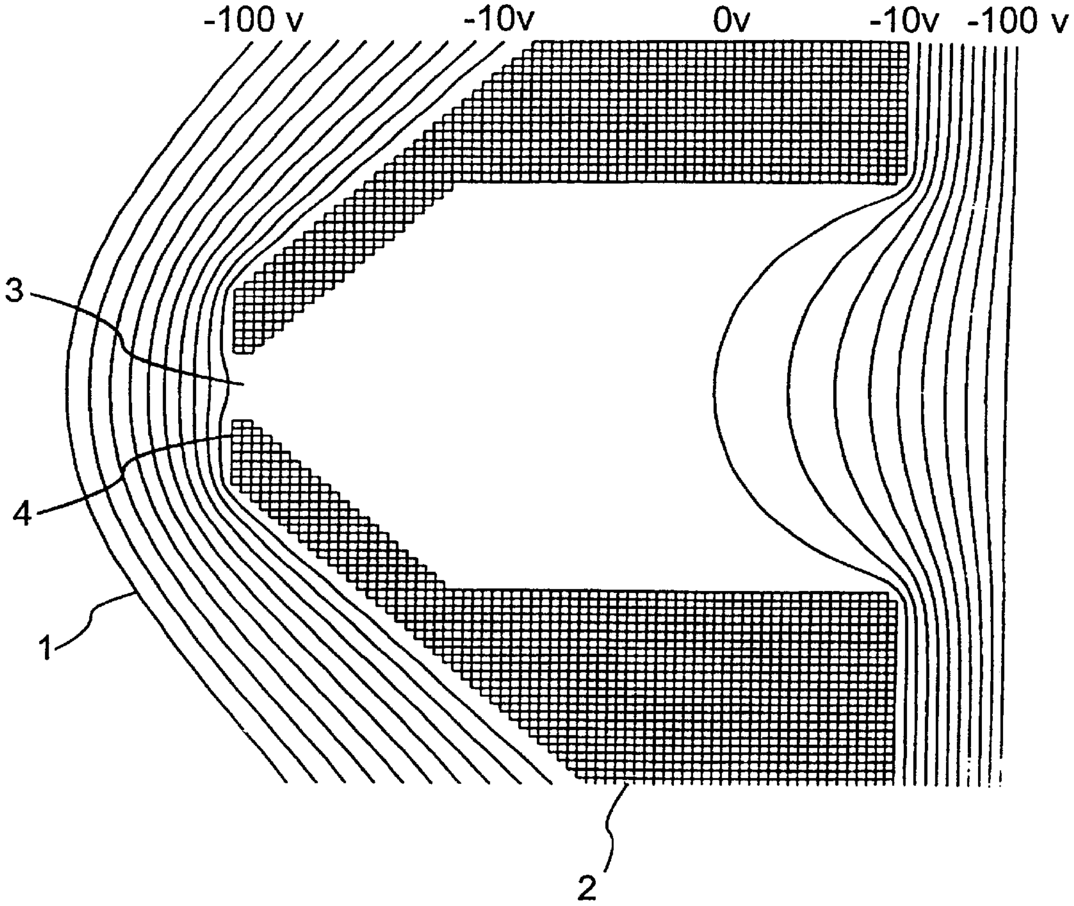
FIG. 12 shows the results of a computer simulation in the region around the aperture of the optical element of FIG. 11*b*.

Referring to FIG. 11*a*, the source of irradiation 18 typically, but not exclusively, a pulsed laser beam 16, is passed through a neutral density filter 17 which attenuates the power and is then reflected by means of a mirror 15 to a focusing lens 5 and into an evacuated chamber 14 through a window 6. The laser beam 16 is reflected at the reflective surface 1*a* of the optical element 4 and directed towards the sample 8 at a small angle with respect to the extraction axis 2. In the case of this preferred embodiment, this angle is approximately 4.5°. Charged particles generated by the laser beam are accelerated along the axis of extraction 2 by electric fields supplied by the extraction elements 9. An electrostatic lens 10 focuses the extracted ions (indicated by the trajectory envelope 19) at or near to the hole 7 in the pyramidal optical element 4. The mirror support 11 and mirror 4 are held at the same potential and form a part of the charged particle optical system. The charged particles are transmitted through the aperture into the cavity 12 and then into an optional electrostatic lens 13 for additional focusing. FIG. 12 shows a computer simulation of the region directly in front of the hole 3 in the front surface 4 of the pyramidal optical element 2. The lines of equal potential 1 are spaced at 10 volt separation and show the minimal effects of the optical element 2 in the electrostatic field. The cavity is kept nearly field-free in this example.

Sample visualisation is achieved by using a second reflective surface of the optical element to view the sample by means of a microscope system external to the vacuum system. Such a system is commonly available and is not shown in detail here. Sample illumination can be implemented using a third face of the optical element.

Additional light irradiation sources can be introduced to the sample by using the fourth reflective surface of the optical element. This irradiation source can be employed simultaneously or sequentially.

A further advantage of this invention is that it is now possible to move the laser across the reflective surface of the optical element thereby allowing scanning of an area of the sample. The areal power density is kept constant during the scanning due to the near perpendicular angle. This scanning technique is commonly used for imaging samples so the possibility of obtaining chemical maps of a sample are now easily and effectively achieved at low cost. Variable focusing of the laser spot is also readily achieved with little or no degradation of the optical performance of the system.

What is claimed is:

1. An apparatus for the production and extraction of charged particles comprising a sample substrate upon which a sample is deposited, an optical element having at least one reflective surface and having at least one hole extending through the optical element, irradiation means for directing radiation onto a surface of the sample via said at least one reflective surface to stimulate emission of charged particles and extraction means for extracting at least some of the charged particles and directing the extracted charged particles away from said surface along an extraction axis so that said charged particles pass from said sample through said hole in the optical element, wherein the optical element has at least one side surface inclined towards the sample, the or each side surface is disposed downstream of an opening to said at least one hole with respect to the direction of extraction of the charged particles, and said at least one reflective surface is provided on a said side surface.

2. An apparatus as claimed in claim 1, wherein the optical element has more than one said side surface disposed symmetrically about the extraction axis.

3. An apparatus as claimed in claim 1, wherein said optical element has a further surface which lies in a plane perpendicular to the extraction axis and faces said sample.

4. An apparatus as claimed in claim 3 wherein said further surface facing said sample is a flat surface.

5. An apparatus as claimed in claim 3, wherein said further surface facing said sample is a concave surface.

6. An apparatus as claimed in claim 3 wherein said further surface facing said sample is a convex surface.

7. An apparatus as claimed in claim 3, wherein said further surface facing said sample is a complex surface comprising flat, concave or convex components.

8. An apparatus as claimed in claim 1, wherein the optical element has more than one said side surface and said at least one reflective surface is provided on each of said side surfaces.

9. An apparatus as claimed in claim 1, wherein said optical element has the shape of a truncated pyramid and said at least one reflective surface is provided on all or part of at least one angled side of the truncated pyramid.

10. An apparatus as claimed in claim 1, wherein said optical element has the shape of a truncated cone, said at least one reflective surface being provided on the conical surface of the truncated cone.

11. An apparatus as claimed in claim 1 in which said at least one reflective surface is inclined at or around an angle of 45° to said extraction axis.

12. An apparatus as claimed in claim 1 further comprising a means of observation of said sample using at least one of said reflective surfaces.

13. An apparatus as claimed in claim 1 further comprising a means of illumination of said sample using at least one of said reflective surfaces.

14. An apparatus as claimed in claim 1 where the said optical element is made from or coated by a n electrically conductive material.

15. An apparatus as claimed in claim 1 where at least one of said reflective surfaces has a coating to provide a specific reflection coefficient.

16. An apparatus as claimed in claim 15 where each of at least two of said reflective surfaces has a different said coating.

17. An apparatus as claimed in claim 1 where the or each said reflective surface is flat or concave.

18. An apparatus as claimed in claim 1, wherein said charged particles are focused at or close to said hole in order to pass efficiently through it.

19. An apparatus as claimed in claim 1, wherein said irradiation means further includes means for scanning said radiation over said sample.

20. An apparatus as claimed in claim 1 wherein said irradiation means includes multiple sources producing radiation which is reflect at one or more of said reflective surfaces.

21. An apparatus as claimed in claim 20, wherein the radiation derived from said multiple sources is applied either simultaneously or sequentially.

22. An apparatus as claimed in claim 1, wherein said hole in said element is circular.

23. An apparatus as claimed in claim 1, wherein said hole in said element is elliptical.

24. An apparatus as claimed in claim 1, wherein said hole in said element is of regular shape comprising two or more curved segments.

25. An apparatus as claimed in claim 1, wherein said hole in said element is of irregular shape, comprising two or more curved segments.

26. An apparatus as claimed in claim 1, wherein said hole in said element is of regular shape, comprising three or more straight segments.

27. An apparatus as claimed in claim 1, wherein said hole in said element is of irregular shape, comprising three or more straight segments.

28. An apparatus as claimed in claim 1 containing more than one of said holes in said element.

29. An apparatus as claimed in claim 1, wherein said hole or holes in said element are covered by a mesh or grid.

* * * * *